(12) United States Patent
Choi et al.

(10) Patent No.: US 11,444,467 B2
(45) Date of Patent: Sep. 13, 2022

(54) SMART BALANCING ENERGY CHARGING CONTROL SYSTEM

(71) Applicant: ENERCAMP CO., LTD., Daegu (KR)

(72) Inventors: Jung Sub Choi, Daegu (KR); Jun Nam Park, Daegu (KR)

(*) Notice: Subject to any disclaimer, the term of this patent is extended or adjusted under 35 U.S.C. 154(b) by 0 days.

(21) Appl. No.: 16/615,406

(22) PCT Filed: Oct. 16, 2019

(86) PCT No.: PCT/KR2019/013542
§ 371 (c)(1),
(2) Date: Nov. 21, 2019

(87) PCT Pub. No.: WO2020/080811
PCT Pub. Date: Apr. 23, 2020

(65) Prior Publication Data
US 2021/0336447 A1    Oct. 28, 2021

(30) Foreign Application Priority Data

Oct. 16, 2018 (KR) .................. 10-2018-0123166
Oct. 15, 2019 (KR) .................. 10-2019-0127831

(51) Int. Cl.
*H02J 7/00* (2006.01)
*H02J 7/02* (2016.01)
*H02J 7/35* (2006.01)

(52) U.S. Cl.
CPC .......... *H02J 7/0014* (2013.01); *H02J 7/0048* (2020.01); *H02J 7/02* (2013.01); *H02J 7/35* (2013.01); *H02J 2207/40* (2020.01)

(58) Field of Classification Search
CPC .................................................. H02J 7/0014
(Continued)

(56) References Cited

U.S. PATENT DOCUMENTS

| 2003/0160593 A1* | 8/2003 | Yau | H02J 7/0018 320/116 |
| 2012/0105001 A1* | 5/2012 | Gallegos | H02J 7/0027 320/109 |

(Continued)

FOREIGN PATENT DOCUMENTS

| KR | 20110038841 | * 4/2011 |
| KR | 20-2012-0000788 | 2/2012 |
| KR | 101197243 | * 11/2012 |

OTHER PUBLICATIONS

English Specification of 20-2012-0000788.

*Primary Examiner* — Yalkew Fantu
(74) *Attorney, Agent, or Firm* — Antonio Ha & U.S. Patent, LLC (57) ABSTRACT

Disclosed is a smart balancing energy charging control system including a multi-power input unit connected to each of different power sources and receiving power for charging a battery pack from the different power sources, a micro-controller unit performing charging within rated power of the battery pack using charge power applied from the different power sources applied from the multi-power input unit and performing smart charging balancing control by determining whether a predetermined condition is met, and a battery pack charge connection unit coupled to the battery pack and charging the battery pack with the charge power applied through the smart charging balancing control under the control of the micro-control unit.

10 Claims, 6 Drawing Sheets

(58) Field of Classification Search
USPC .......................................................... 320/101
See application file for complete search history.

(56) References Cited

U.S. PATENT DOCUMENTS

2014/0306666 A1* 10/2014 Choi ..................... H02J 7/0016
320/134
2016/0336765 A1* 11/2016 Trimboli ................... H02J 7/00

\* cited by examiner

FIG. 6

SMART BALANCING ENERGY CHARGING CONTROL SYSTEM

TECHNICAL FIELD

The present disclosure relates to a smart balancing energy charging control system.

BACKGROUND ART

In general, various electronic products of electric/electronic devices that require a power source are used by connecting commercial power provided from an electricity provider (e.g., Korea Electric Power Corporation (KEPCO)) to an outlet provided in a house or office. In addition, in places where commercial power is not provided, electric devices may be supplied with power using an integrated or detachable battery, instead of commercial power.

Meanwhile, with the recent increase in the level of income and the widespread five-day workweek, a simple form of money consumption tends to be shifted to a form of time consumption to enjoy travel or sports. For example, an increase in the population of autocamping leads to a significant growth of related industries.

As the social interest in the outdoor activities is increasing, demand for driving various electronic products using batteries are increasing. In other words, as the interest in outdoor activities has increased, the number of people who want to enjoy outdoor activities such as camping, fishing, and vacation has increased significantly, and as the outdoor culture such as camping or the like has been shifted by family units, various electronic products outdoors tends to be increasingly used. As such, various electric devices including laptops and smartphones or the like in modern life are essential items carried by modern people, which are also carried and used by campers, requiring electricity to be supplied even during camping. In most camping sites, electric power is not smoothly supplied, leading to problems in that charging of discharged smartphones or the use of laptops are limited and various camping equipment requiring electric power are also limited in use.

In order to solve the problem, campers use portable camping batteries to supply electric power to electric/electronic devices but suffer a lot of difficulties in recharging the portable camping batteries when they are discharged. The portable camping batteries may be charged using a commercial power source provided in camping sites or may be individually charged using a small solar generator but are limited in use in outdoor places with a lot of campers. Korean Utility Model Laid-open Publication No. 20-2012-0000788 is a related art.

DETAILED DESCRIPTION OF THE INVENTION

Technical Problems

The present disclosure provides a smart balancing energy charging control system which performs charging on a battery pack using charge powers respectively applied from different power sources and enables smart balancing control using charge current control by comparing the charge powers from the different power sources, whereby the battery pack can be stably charged by efficiently controlling power supply from the different power sources.

The present disclosure also provides a smart balancing energy charging control system which charges a battery pack using charge powers respectively applied from different power sources and selectively controls a power source according to location characteristics of outdoor activities or weather, thereby enabling efficient supply control of multi-power as well as charging using simple power supply, enabling efficient use and control of power supply, and further enhancing user convenience in outdoor activities such as autocamping.

Means to Achieve the Objects

In an aspect, a smart balancing energy charging control system includes: a multi-power input unit connected to each of different power sources and receiving power for charging a battery pack from the different power sources; a micro-controller unit performing charging within rated power of the battery pack using charge power applied from the different power sources applied from the multi-power input unit and performing smart charging balancing control by determining whether a predetermined condition is met; and a battery pack charge connection unit coupled to the battery pack and charging the battery pack with the charge power applied through the smart charging balancing control under the control of the micro-control unit.

The different power sources may include a primary power source receiving first DC power from a new renewable energy source and a secondary source power receiving AC power or second DC power on the basis of a commercial power source.

The multi-power input unit may include a first power input terminal receiving the first DC power from the new renewable energy source, and a second power input terminal receiving the AC power or the second DC power on the basis of the commercial power source.

In the smart charging balancing control, the battery pack may be charged by increasing use of the primary power source and reducing use of the secondary power source or cutting off supply of the secondary power source when the predetermined condition is met.

The predetermined condition may include a case where an energy level of the primary power source is higher than a predetermined value.

In the smart charging balancing control, the predetermined condition may include a case where power generation efficiency of the primary power source is higher than a predetermined value in outdoor activities, and the battery pack may be charged by increasing a current of the primary power source and lowering a current of the secondary power source or cutting off supply of the secondary power source when the predetermined condition is met.

In the smart charging balancing control, power of the secondary power source may be cut off and charging may be performed only through the primary power source when efficiency of the new renewable energy source is higher than a predetermined value.

In the smart charging balancing control, charging may be controlled by determining a predetermined time and a charge amount and switching the primary power source and the secondary power source.

The micro-control unit may perform charging on the battery pack using power supply of any one of the different power sources or perform charging on the battery back through current control upon receiving multi-power supply from the different power sources.

The micro-control unit may perform smart balancing control by comparing charge powers of the different power sources, and the smart balancing control may be charging current control of the different power sources.

The micro-control unit may perform charging on the battery pack using power supply of any one of the different power sources or perform charging on the battery back through current control upon receiving multi-power supply from the different power sources.

When rated power for charging the battery pack is 12V/10 Ah, the micro-control unit may perform smart balancing control with a solar power source (or solar charger) of 12V/5 Ah and an adapter power source of 12V/5 Ah which are the different power sources, and when a generation amount of the solar power source is high due to fine weather, the micro-control unit may perform predetermined smart balancing control by increasing a current of the solar power source and lowering a current of a commercial power source (or wall charger).

When rated power for charging the battery pack is 12V/10 Ah, the micro-control unit may perform smart balancing control with the solar power source of 12V/5 Ah and the adapter power source of 12V/5 Ah which are the different power sources, and when the generation amount of the solar power source is low due to cloudy weather, the micro-control unit may perform predetermined smart balancing control by increasing the current of the solar power source and lowering the current of the commercial power source.

The battery pack is an auxiliary battery device for outdoor camping for supplying DC power or AC power to an electric or electronic device used in the open air.

The smart balancing energy charging control system may further include a wireless communication module enabling IoT, wherein the smart balancing energy charging control system may control the charging by receiving schedule information of a user by utilizing weather information through the Internet or schedule management information of the user of a schedule management service of a smartphone schedule application via the wireless communication module.

The smart balancing energy charging control system may control to controls to perform the charging by determining that it is possible to perform full charging only with the new renewable energy source without using the commercial power source on the basis of the schedule management information of the user and weather information including a weather forecast through the Internet.

Effects of the Invention

According to the smart balancing energy charging control system proposed in the present disclosure, the battery pack is charged using the charge power applied from different power sources and smart balancing control is performed using charge current control by determining whether a predetermined condition is met, whereby the battery pack may be stably charged through effective control of power supply from different power sources.

Furthermore, according to the smart balancing energy charging control system proposed in the present disclosure, the battery pack may be charged using the charge power applied from different power sources and supply of multi-power, as well as charging using simple power supply, may be efficiently controlled by selectively controlling a power source according to location characteristics or weather in outdoor activities, power supply may be efficiently used and controlled accordingly, and user convenience in outdoor activities such as autocamping may be further enhanced.

BEST MODE TO PRACTICE THE INVENTION

Hereinafter, embodiments will be described in detail with reference to the accompanying drawings such that they can be easily practiced by those skilled in the art to which the present invention pertains. In describing the present invention, if a detailed explanation for a related known function or construction is considered to unnecessarily divert the gist of the present invention, such explanation will be omitted but would be understood by those skilled in the art. Also, similar reference numerals are used for the similar parts throughout the specification.

It will be understood that when an element is referred to as being "connected to" another element, it can be directly connected to the other element or intervening elements may also be present. In contrast, when an element is referred to as being "directly connected to" another element, no intervening elements are present. In addition, unless explicitly described to the contrary, the word "comprise" and variations such as "comprises" or "comprising," will be understood to imply the inclusion of stated elements but not the exclusion of any other elements.

Figure 1:
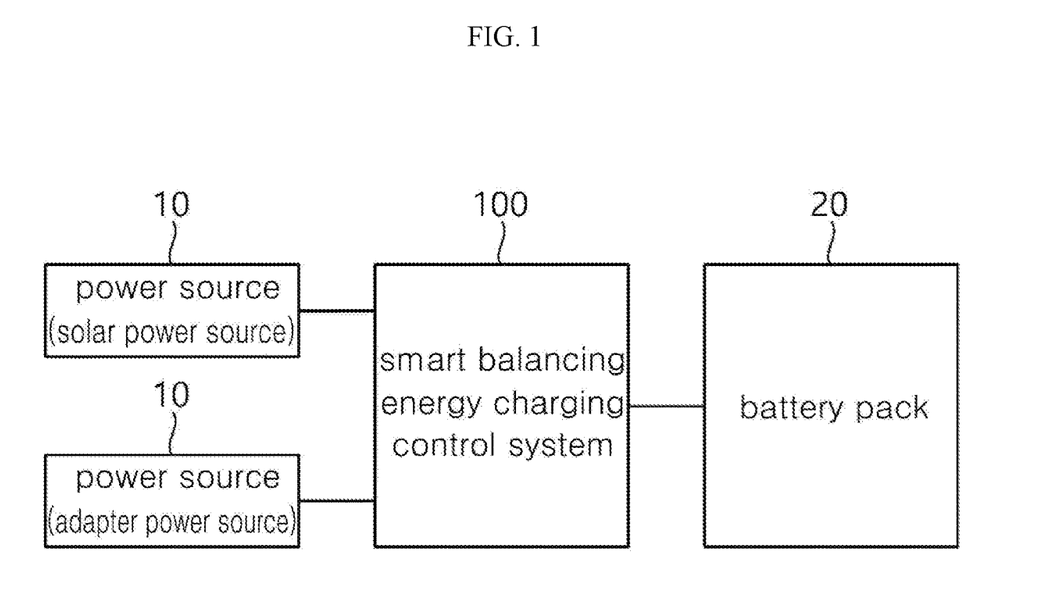
FIG. 1 is a block diagram of a smart balancing energy charging control system according to an embodiment of the present disclosure.
Figure 2:
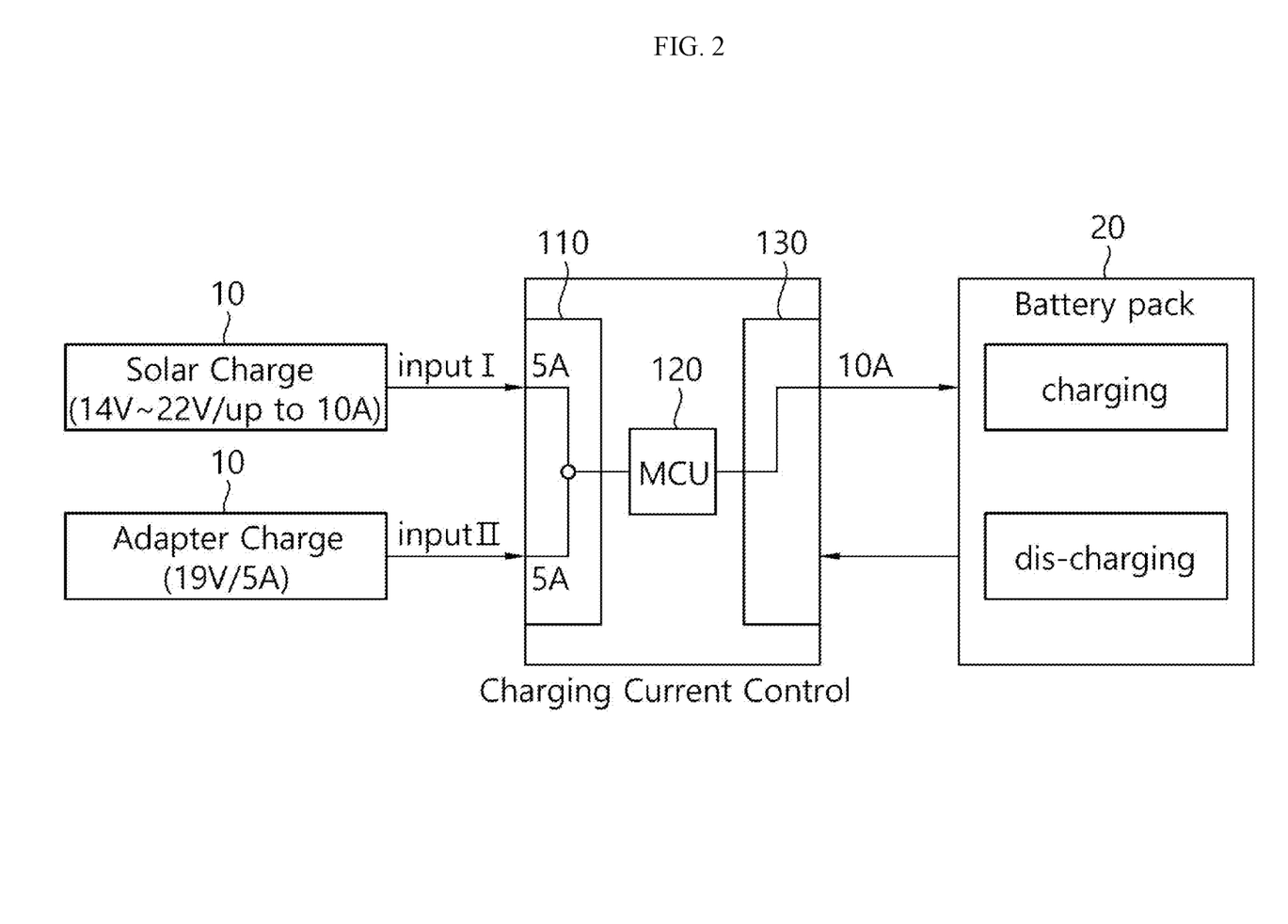
FIG. 2 is a block diagram showing a configuration of a smart balancing energy charging control system according to an embodiment of the present disclosure.
Figure 3:
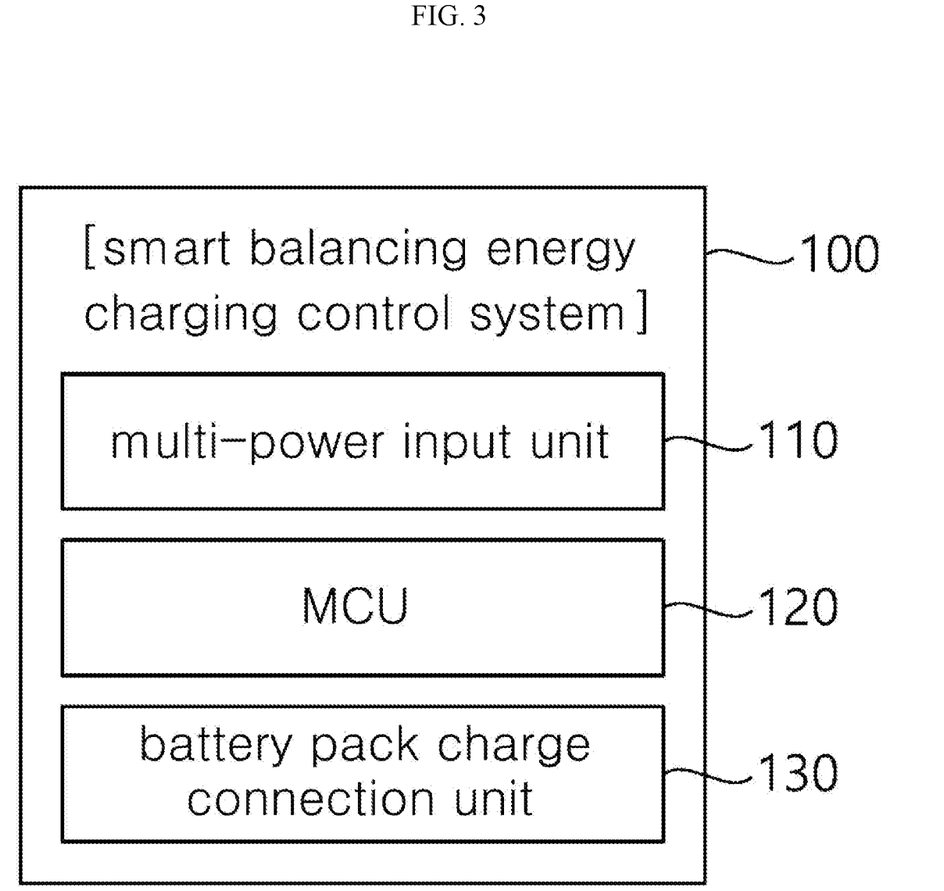
FIG. 3 is a block diagram illustrating a smart balancing energy charging control system according to an embodiment of the present disclosure.
Figure 4:
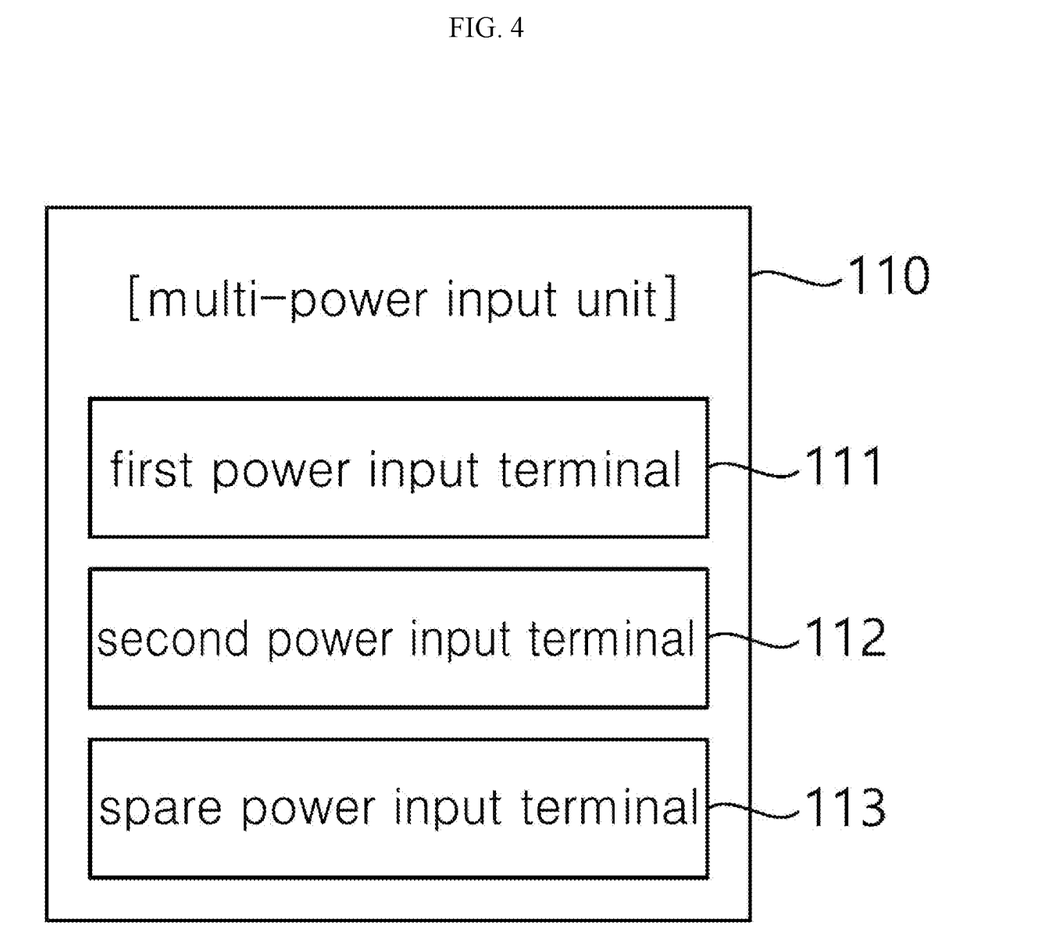
FIG. 4 is a block diagram showing a configuration of a multi-power input unit applied to the smart balancing energy charging control system according to an embodiment of the present disclosure.
Figure 5:
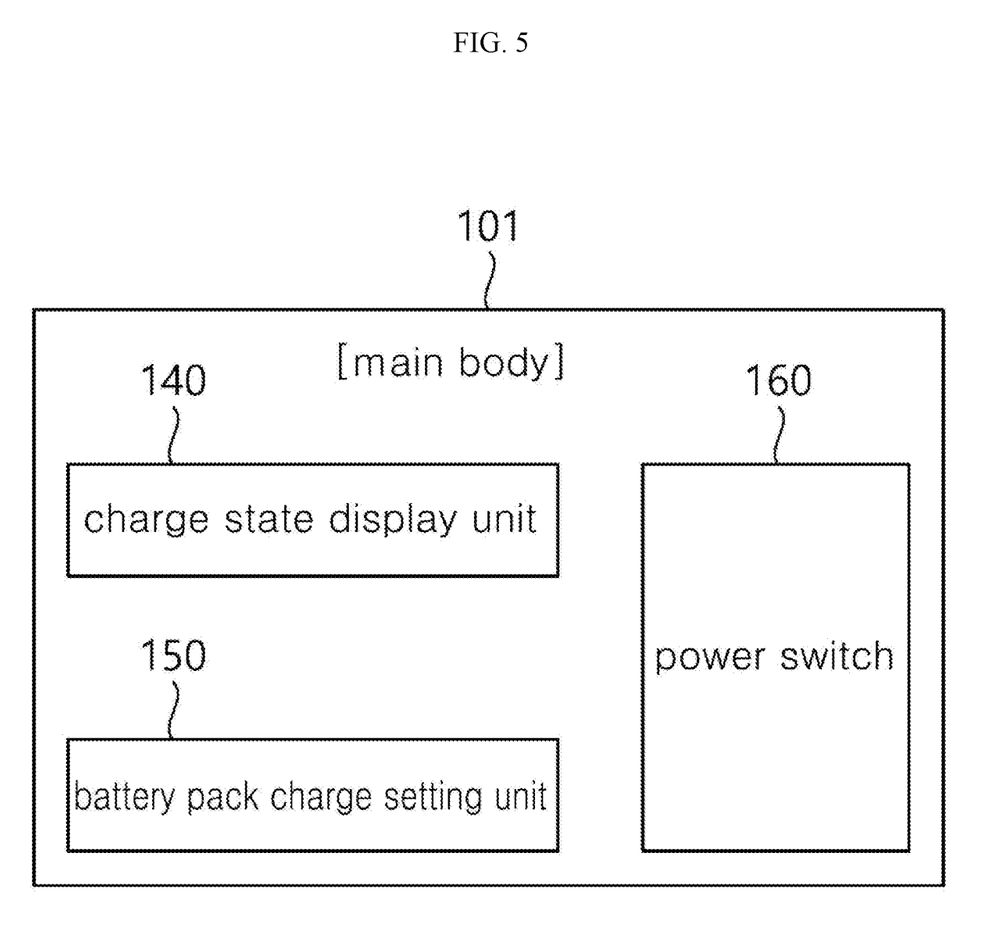
FIG. 5 is a block diagram showing a configuration provided in a main body of a smart balancing energy charging control system according to an embodiment of the present disclosure.

FIG. 1 is a view showing a whole system connection configuration illustrating the concept of a smart balancing energy charging control system according to an embodiment of the present disclosure, FIG. 2 is a view illustrating a configuration of a smart balancing energy charging control system according to an embodiment of the present disclosure, FIG. 3 is a block diagram illustrating a configuration of a smart balancing energy charging control system according to an embodiment of the present disclosure, FIG. 4 is a block diagram illustrating a configuration of a multi-power input unit applied to a smart balancing energy charging control system according to an embodiment of the present disclosure, and FIG. 5 is a block diagram illustrating a configuration of a main body of a smart balancing energy charging control system according to an embodiment of the present disclosure. As shown in FIGS. 1 to 5, a smart balancing energy charging control system 100 according to an embodiment of the present disclosure may include a multi-power input unit 110, a micro-control unit 120, and a battery pack charge connection unit 130.

The multi-power input unit 110 is connected to each of different power sources 10 and receives power for charging a battery management system (BMS). As shown in FIG. 4, the multi-power input unit 110 may include a first power input terminal 111 for receiving photoelectrically converted DC power from a photovoltaic module and a second power input terminal 112 for receiving DC power of an adapter which converts commercial power into DC power and supplies the converted DC power. Here, the multi-power input unit 110 may further include a spare power input terminal 113 in addition to the first power input terminal 111 for receiving solar power and the second power input terminal 112 for receiving the adapter power. Here, the spare power input terminal 113 may be used as a spare connection terminal in case of an abnormal connection of the first and second power input terminals 111 and 112.

The different power sources 10 may include a solar power source supplying the photoelectrically converted DC power from the photovoltaic module and an external adapter power source converting commercial power (AC 110V or AC 220V) into DC power and supplying the converted DC power. Alternatively, the adapter power source may be realized as an internal power source of the smart balancing energy charging control system. Here, as the power source 10 using the solar power source, various new renewable power source such as a small wind generator or a small self-generator, e.g., a self-generator in the form of a waterwheel using a stream, which may be used in the open air, in addition to the photovoltaic module, may also be applied. The battery pack 20 is an auxiliary battery device for outdoor camping for supplying DC power or AC power to an electric or electronic device used in the open air.

The micro-control unit 120 is a controller which performs charging within rated power of the battery pack 20 using applied charge power of the different power sources 10 applied from the multi-power input unit 110, and here, the micro-control unit 120 performs smart balancing control by comparing the charge powers of the different power sources 10 and the smart balancing control is charging current control of the different power sources 10. In the case of charging by voltage controlling, overcharging may be performed due to an over voltage at a timing when the battery is fully charged, and thus, the battery may be damaged when used for a long period of time, affecting battery life. In contrast, the smart balancing energy charging control system 100 performs quick charging through current control, and when the battery is fully charged, the smart balancing energy charging control system 100 controls a current amount to prevent overload of the battery, thereby extending battery life as compared with general products. According to the current control technology of the smart balancing energy charging control system 100 according to an embodiment of the present disclosure, which is particularly differentiated from the existing products, a product such as a battery pack or the like may be more efficiently charged through current control by the smart balancing energy charging control system 100 when efficiency of an accurate charge amount is measured for full charging of the battery pack, as compared with charging by general voltage control.

Alternatively, the micro-control unit 120 may perform smart charging balancing control by determining whether a predetermined condition is met. The predetermined condition may include a case where an energy level, power, or energy efficiency of a new renewable power source is higher than a predetermined value. For example, the predetermined condition may include a case where the energy level, power, or energy efficiency of the new renewable power source satisfies at least 5 W and is higher than 10% of a maximum power value. For example, if a new renewable energy source having a maximum output of 100 W is input with energy efficiency of 10 W or more and satisfies the minimum value of 5 W or more, power of a commercial power source may be cut off and the new renewable energy power may be used as an input source.

In the smart charging balancing control, when the predetermined condition is met, the battery pack may be charged by increasing use of the new renewable power and reducing use of the adapter power or cutting off power supply of the adapter power. In the smart charging balancing control, the predetermined condition may include a case where power generation efficiency of the new renewable power is higher than a predetermined value in outdoor activities, and when the predetermined condition is met, the current of the renewable power may be increased and a current of the adapter power may be lowered or power supply of the adapter power may be cut off, thereby charging the battery pack.

In addition, in the smart charging balancing control, when efficiency of the new renewable energy source is higher than a predetermined value upon receiving an input from the multi-power source, power of the commercial power source (adapter power source) may be cut off and charging is performed only through the new renewable energy source, and the new renewable energy source and the commercial power source may be flexibly switched upon checking a predetermined time and a charge amount, whereby a product such as the battery pack or the like may be easily and conveniently charged even without a user's special measure for charging. For example, in the smart charging balancing control, if efficiency of the new renewable energy source input, upon receiving the input of the multi-power source, is 10% higher than a charge efficiency of the commercial power source, power from the commercial power source (adapter power source) may be cut off and charging may be performed only through the new renewable energy source. For example, when the efficiency of 10% is 6 W, and here, if the new renewable energy source having a maximum 100 W output is input with energy efficiency of 6 W or more, which exceeds 10% of charging efficiency of the commercial power source, power from the commercial power source may be cut off and the new renewable energy power may be used as an input source.

In addition, the micro-control unit 120 may perform charging on the battery pack 20 using power supply from any one of the different power sources 10 or perform charging on the battery pack 20 through current control upon receiving multi-power from the different power sources 10. That is, the micro-control unit 120 may function to enable efficient power supply through current control by receiving multi-power supply as well as charging using simple power supply.

In addition, if the rated power for charging the battery pack 20 is 12V/10 Ah, the micro-control unit 120 may perform smart balancing control with solar power source of 12V/5 Ah and adapter power source of 12V/5 Ah which are the different power sources 10, and here, if weather is fine and a generation amount of the solar power source is high, the micro-control unit 120 may perform predetermined smart balancing control by increasing a current of the solar power source and lowering a current of the commercial power source. That is, in the case of charging the battery pack 20 in outdoor activities such as camping, when the solar power source and the commercial power source are used as the multi-power source, if weather is fine and power generation efficiency of the solar power source is higher, smart balancing control may be performed to charge the battery pack 20 by reducing use of the commercial power source which pays cost and by efficiently supplying power through the solar power source.

Meanwhile, if the rated power for charging the battery pack 20 is 12V/10 Ah, the micro-control unit 120 may perform smart balancing control with solar power source of 12V/5 Ah and adapter power source of 12V/5 Ah which are the different power sources 10, and here, if weather is cloudy and a generation amount of the solar power source is low, the micro-control unit 120 may perform the predetermined smart balancing control by lowering the current of the solar power source and increasing the current of the commercial power source. Here, 12V/10 Ah of the rated power source for charging the battery pack 20 is an example of an embodiment of the present disclosure and is not limited thereto, and various rated power sources may be used.

The battery pack charge connection unit 130 is connected to the battery pack 20 or the battery management system (BMS) and charges the battery pack 20 or the BMS with charge power applied through smart balancing control under the control of the micro-control unit 120.

The smart balancing energy charging control system 100 according to the present disclosure may further include a charge state display unit 140, a battery pack charge setting unit 150, and a power switch 160 exposed from the main body 101, in addition to the multi-power input unit 110, the micro-control unit 120, and the battery pack charge connection unit 130, as shown in FIG. 5. Here, the charge state display unit 140 may display a state such as a charge voltage, a charge rate, and the like which is a charge state of the battery pack 20, the battery pack charge setting unit 150 may be configured as an operating unit for setting rated power for charging the battery pack 20, and the power switch 160 may function as a power on/off switch of the smart balancing energy charging control system 100. In addition, the main body 101 may have a structure including a plurality of through holes (not shown) to reduce heat generated in the process of quick charging and may have a shape of an enclosure with a handle (not shown) which may increase portability and user convenience.

As described above, the smart balancing energy charging control system according to an embodiment of the present disclosure is configured to perform charging on the battery pack using charge powers applied from the different power sources and perform smart balancing control using charge current control by comparing charge powers of the different power sources, thereby enabling stable charging of the battery pack through efficient control of power supplies of the different power sources. In particular, when charging the battery pack using the charge powers applied from the different power sources, the smart balancing energy charging control system according to an embodiment of the present disclosure may selectively control the power sources according to location characteristics of outdoor activities or weather, thereby enabling efficient supply control of multi-power as well as charging using simple power supply, enabling efficient use and control of power supply, and further enhancing user convenience in outdoor activities such as autocamping.

Figure 6:
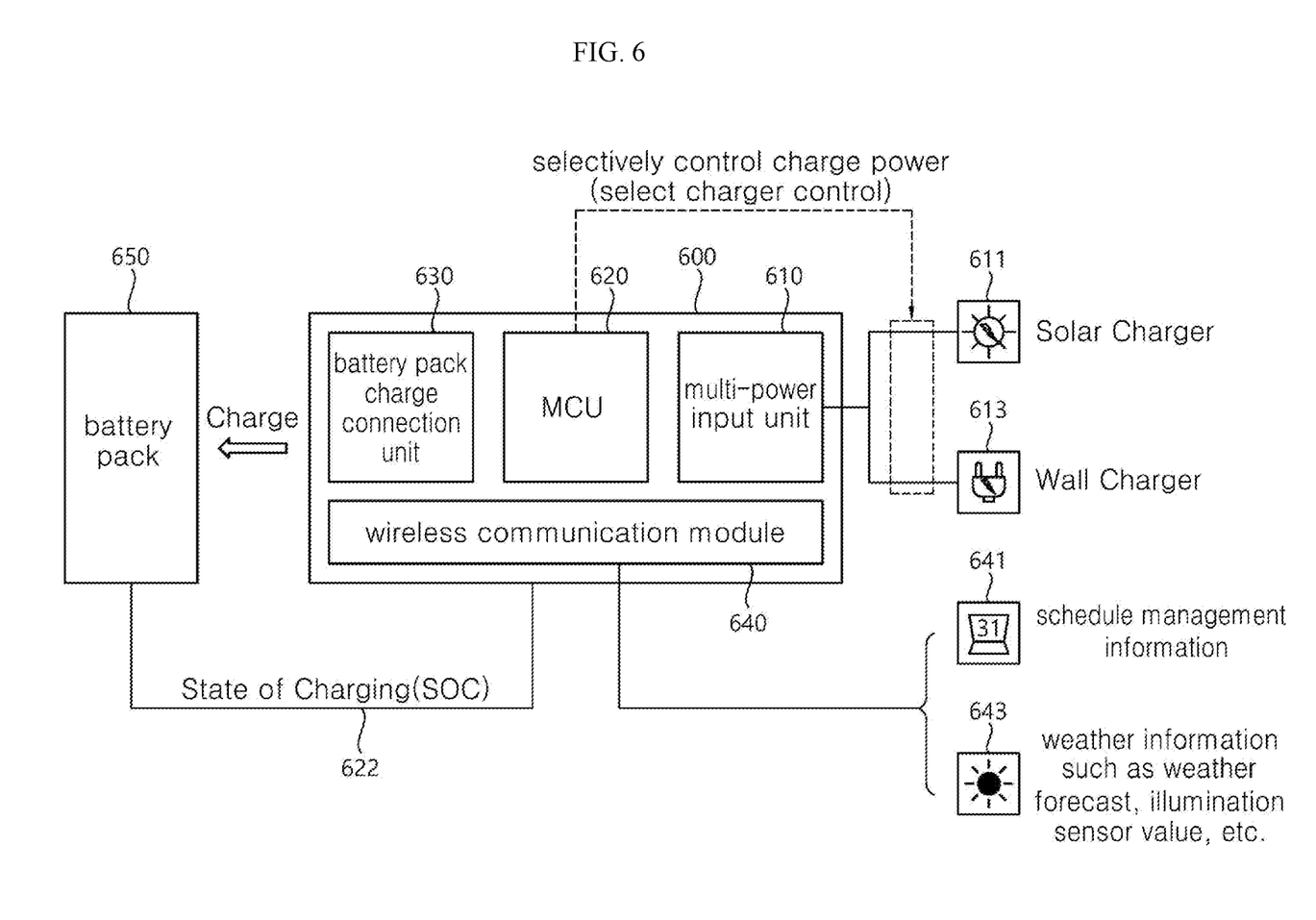
FIG. 6 is a block diagram illustrating a smart balancing energy charging control system according to another embodiment of the present disclosure.

FIG. 6 is a block diagram illustrating a smart balancing energy charging control system according to another embodiment of the present disclosure.

Referring to FIG. 6, the smart balancing energy charging control system 600 according to another embodiment of the present disclosure may include a multi-power input unit 610, a micro-control unit 620, a battery pack charge connection unit 630, and a wireless communication module 640 enabling IoT.

The multi-power input unit 610, the micro-control unit 620, the battery pack charge connection unit 630 of FIG. 6 correspond to the multi-power input unit 110, the micro-control unit 120, and the battery pack charge connection unit 130 of FIG. 3, and thus, a detailed description thereof will be omitted.

The smart balancing energy charging control system 600 may support efficient charging of the battery pack by collecting schedule information of the user by utilizing weather information 643 including weather forecast, an illumination sensor value, and the like through the Internet and/or schedule management information 641 of the user of a schedule management service of a smartphone schedule application, in addition to voltage/current sensing data for a multi-power input through the wireless communication module 640.

For example, if the user is schedule to go camping this Saturday in a schedule application of the smartphone, the smart balancing energy charging control system 600 may acquire the schedule management information 641 through the Internet via the wireless communication module 640 and receive information indicating that fine weather is forecast for one week through the weather information 643 such as weather forecast through the wireless communication module 640. Here, the smart balancing energy charging control system 600 may determine to fully charge the battery pack 650 for five days only by a new renewable energy source without using the commercial power source, when starting to charge the product such as the battery pack 650 or the like through the commercial power source 613 and a new renewable power source such as the solar power source 611 this weekend, and control charging accordingly.

In addition, in the above embodiment, the smart balancing energy charging control system 600 may check a state of charging 622 and if it determines that it is impossible to charge with the new renewable energy for the remaining time till this Friday due to a low charge rate, the smart balancing energy charging control system 600 may control charge power selection to automatically select the commercial power source to perform charging.

While the present disclosure has been shown and described in connection with the embodiments, it will be apparent to those skilled in the art that modifications and variations may be made without departing from the spirit and scope of the invention as defined by the appended claims.

DESCRIPTION OF REFERENCE NUMERAL 10, 611, 613: power source
20: battery pack
100, 600: smart balancing energy charging control system
101: main body
110, 610: multi-power input unit
111: first power input terminal
112: second power input terminal
113: spare power input terminal
120, 620: micro-control unit
130, 630: battery pack charge connection unit
140: charge state display unit
150: battery pack charge setting unit
160: power switch

The invention claimed is:

1. A smart balancing energy charging control system comprising:
- a multi-power input unit connected to each of different power sources and receiving power for charging a battery pack from the different power sources, the different power sources comprising a primary power source receiving first DC power from a new renewable energy source and a secondary source power receiving AC power or second DC power on the basis of a commercial power source:
- a micro-controller unit performing charging within rated power of the battery pack using charge power applied from the different power sources applied from the multi-power input unit and performing smart charging balancing control by determining whether a predetermined condition is met;
- a battery pack charge connection nit coupled to the battery pack and charging the battery pack with the charge power applied through the smart charging balancing control under the control of the micro-control unit; and
- a wireless communication module capable of communicating with a user's smartphone,
- wherein the micro-controller unit receives the user's camping schedule information from a smartphone schedule application through the wireless communication module, selects the primary power source or the secondary power source, and fully charges the battery pack with the selected power source based on the user's camping schedule information.

2. The smart balancing energy charging control system of claim 1, wherein the multi-power input unit comprises a first power input terminal receiving the first DC power from the new renewable energy source and a second power input terminal receiving the AC power or the second DC power on the basis of the commercial power source.

3. The smart balancing energy charging control system of claim 1, wherein, in the smart charging balancing control, the battery pack is charged by increasing use of the primary power source and reducing use of the secondary power source or cutting off supply of the secondary power source when the predetermined condition is met.

4. The smart balancing energy charging control system of claim 1, wherein the predetermined condition includes a case where an energy level of the primary power source is higher than a predetermined value.

5. The smart balancing energy charging control system of claim 1, wherein, in the smart charging balancing control, the predetermined condition comprises a case where power generation efficiency of the primary power source is higher than a predetermined value in outdoor activities, and the battery pack is charged by increasing a current of the primary power source and lowering a current of the secondary power source or cutting off supply of the secondary power source when the predetermined condition is met.

6. The smart balancing energy charging control system of claim 1, wherein, in the smart charging balancing control, power of the secondary power source is cut off and charging is performed only through the primary power source when efficiency of the new renewable energy source is higher than a predetermined value.

7. The smart balancing energy charging control system of claim 1, wherein, in the smart charging balancing control, charging is controlled by determining a predetermined time and a charge amount and switching the primary power source and the secondary power source.

8. The smart balancing energy, charging control system of claim 1, wherein the smart balancing control is charging current control of the different power sources.

9. The smart balancing energy charging control system of claim 8, wherein the micro-control unit performs charging on the battery pack using power supply of any one of the different power sources or performs charging on the battery back through current control upon receiving multi-power supply from the different power sources.

10. The smart balancing energy charging control system of claim 1, wherein the smart balancing energy charging control system controls to perform the charging by determining that it is possible to perform full charging only with the new renewable energy source without using the commercial power source on the basis of the schedule management information of the user and weather information including a weather forecast through the Internet.

* * * * *